United States Patent
de Almeida Botelho et al.

(10) Patent No.: US 6,514,564 B2
(45) Date of Patent: Feb. 4, 2003

(54) DYNAMIC BLENDING GAS DELIVERY SYSTEM AND METHOD

(75) Inventors: Alexandre de Almeida Botelho, Bethlehem, PA (US); Thomas Anthony Del Prato, Whitehall, PA (US); Robert William Ford, Schnecksville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/799,644

(22) Filed: Mar. 6, 2001

(65) Prior Publication Data

US 2001/0009138 A1 Jul. 26, 2001

Related U.S. Application Data

(62) Division of application No. 09/174,196, filed on Oct. 16, 1998, now Pat. No. 6,217,659.

(51) Int. Cl.[7] .............................. C23C 16/448
(52) U.S. Cl. ................. 427/248.1; 427/255.28
(58) Field of Search ................. 427/248.1, 255.28; 117/715

(56) References Cited

U.S. PATENT DOCUMENTS

| | | | |
|---|---|---|---|
| 3,751,644 A | 8/1973 | Mayer | 235/151.12 |
| 3,771,260 A | 11/1973 | Arenson | 48/190 |
| 3,856,033 A | 12/1974 | Strain et al. | 137/3 |
| 3,948,281 A | 4/1976 | Strain et al. | 137/3 |
| 4,277,254 A | 7/1981 | Hanson | 48/180 |
| 4,345,612 A | 8/1982 | Koni et al. | 137/101.19 |
| 5,419,924 A | 5/1995 | Nagashima et al. | 427/248 |
| 5,476,115 A | 12/1995 | Lalumandier et al. | 137/101.19 |
| 5,495,875 A | 3/1996 | Benning et al. | 141/83 |
| 5,575,854 A | 11/1996 | Jinnouchi et al. | 118/715 |
| 5,690,743 A | 11/1997 | Murakami et al. | 118/715 |
| 5,989,345 A | 11/1999 | Hatano | 118/715 |
| 6,039,809 A | * 3/2000 | Toyama et al. | 118/715 |
| 6,301,434 B1 | * 10/2001 | McDiarmid et al. | 118/724 |

* cited by examiner

Primary Examiner—Timothy Meeks
(74) Attorney, Agent, or Firm—Geoffrey L. Chase

(57) ABSTRACT

A dynamic blending gas delivery system and method are disclosed. A blended gaseous mixture produced in accordance with the method is used in chemical vapor deposition tools or similar process tools. One embodiment is a multi-step method for processing a plurality of fluids to form a blended gaseous mixture and supplying the blended gaseous mixture to a distribution header from which the blended gaseous mixture is delivered to at least one tool. The first step is to supply a first fluid. The second step is to heat the first fluid to a temperature where at least some portion of the first fluid is a vapor. The third step is to superheat the vapor portion of the first fluid to a temperature sufficient to avoid condensation of the blended gaseous mixture delivered to the at least one tool. The fourth step is to supply a second fluid. The fifth step is to heat the second fluid to a temperature sufficient to avoid condensation of the superheated vapor portion of the first fluid when the superheated vapor portion comes in contact with the second fluid. The sixth step is to combine the heated second fluid and the superheated vapor portion of the first fluid to form a blended gaseous mixture having desired physical and chemical properties for chemical vapor deposition, epitaxial film growth, or a similar process. The final step is to deliver the blended gaseous mixture to the distribution header. In the preferred embodiment, the first fluid is trichlorosilane and the second fluid is hydrogen.

8 Claims, 2 Drawing Sheets

DYNAMIC BLENDING GAS DELIVERY SYSTEM AND METHOD

CROSS-REFERENCE TO RELATED APPLICATIONS

This application is a divisional application of U.S. application Ser. No. 09/174,196 filed Oct. 16. 1998, now U.S. Pat. No. 6,217,659.

STATEMENT REGARDING FEDERALLY SPONSORED RESEARCH OR DEVELOPMENT

Not applicable.

BACKGROUND OF THE INVENTION

The present invention relates to an apparatus and method for dynamically blending two or more fluids to form a blended gaseous mixture which is delivered via a distribution header to one or more tools for chemical vapor deposition, including epitaxial film growth or similar layer deposition processes. Although the invention may have other applications, it is particularly applicable in semiconductor fabrication.

Semiconductor manufacturers often use a deposition gas mixture of trichlorosilane ($SiHCl_3$) (TCS) and hydrogen ($H_2$) for growth of thin films (e.g., epitaxial silicon) on silicon wafers. Such a mixture is usually obtained by sparging or bubbling $H_2$ gas into TCS liquid held at a specified temperature in a bubbler apparatus. This apparatus delivers a $H_2$ gas carrier stream saturated with TCS into a process tool used in semiconductor fabrication. However, since the stream must be saturated to ensure a consistent composition into the process tool, the bubbler must be located at close proximity to the process tool to avoid condensation in the customer's supply line (because condensation would affect the stream composition). Consequently, each tool typically has its own bubbler, which significantly increases capital expenditures required to handle TCS and reduces the available floor space in semiconductor fabrication facilities.

It is desired to have a delivery system and method which provide consistent composition of a blended gaseous mixture at a non-saturated condition (i.e., lower TCS dewpoint).

It is further desired to have a distribution header from which the blended gaseous mixture could be delivered to multiple tools, which would reduce floor space requirements and save capital.

It is still further desired to have the ability to provide a blended gaseous mixture to a variable number of process tools while maintaining consistent stream composition.

It is still further desired to have the ability to quickly manipulate the stream composition when end user requirements fluctuate.

BRIEF SUMMARY OF THE INVENTION

The present invention is a dynamic blending gas delivery system and method. The present invention also includes a blended gaseous mixture produced in accordance with the dynamic blending method. The blended gaseous mixture is used in chemical vapor deposition tools or other similar process tools, such as tools used in epitaxial film growth.

A first embodiment of the invention is a method for processing a plurality of fluids to form a blended gaseous mixture and supplying the blended gaseous mixture to a distribution header from which the blended gaseous mixture is delivered to at least one chemical vapor deposition tool or similar process tool. The method comprises seven steps. The first step is to supply a first fluid. The second step is to heat the first fluid to a temperature where at least some portion of the first fluid is a vapor. The third step is to superheat the vapor portion of the first fluid to a temperature sufficient to avoid condensation of the blended gaseous mixture delivered to the at least one chemical vapor deposition tool or similar process tool. The fourth step is to supply a second fluid. The fifth step is to heat the second fluid to a temperature sufficient to avoid condensation of the superheated vapor portion of the first fluid when the superheated vapor portion comes in contact with the second fluid. The sixth step is to combine the heated second fluid and the superheated vapor portion of the first fluid to form a blended gaseous mixture having desired physical and chemical properties for chemical vapor deposition, epitaxial film growth, or a similar process. The final step is to deliver the blended gaseous mixture to the distribution header from which the blended gaseous mixture is delivered to the at least one chemical vapor deposition tool or similar process tool.

In the described apparatus and process, the first fluid is trichlorosilane ($SiHCl_3$) (TCS) and the second fluid is hydrogen ($H_2$). However, the invention may be used to dynamically blend and deliver other vapor deposition fluids. For example, it may be used with other first fluids, including but limited to, silicon tetrachloride ($SiCl_4$), dichlorosilane ($SiH_2Cl_2$), tetraethylorthosilicate (TEOS), phosphorus oxychloride ($POCl_3$), trimethylsilane ($SiH(CH_3)_3$), boron trichloride ($BCl_3$), and tungsten hexafluoride ($WF_6$). Other possible second fluids include, but are not limited to, helium, nitrogen, argon, and oxygen.

A second embodiment of the invention is a method which includes the additional step of automatically maintaining a desired flow ratio between the first and second fluids so as to maintain the desired physical and chemical properties of the blended gaseous mixture. In one variation of this embodiment, the step of automatically maintaining a desired flow ratio between the first and second fluids comprises the following sub-steps: (a) measuring a flow rate of the first fluid; (b) measuring a flow rate of the second fluid; (c) measuring a change in pressure inside the distribution header; and (d) adjusting the flow rates of the first and second fluids at the desired flow ratio proportionally in an inverse relation to a measured change in pressure inside the distribution header.

A third embodiment includes three steps in addition to the steps in the first embodiment discussed above. The first additional step is to supply a third fluid which does not react with the first or second fluids or with the blended gaseous mixture. The next additional step is to heat the third fluid to a temperature sufficient to avoid condensation of the blended gaseous mixture delivered to the at least one chemical vapor deposition tool or similar process tool. The final additional step is to combine an amount of the heated third fluid in the gaseous phase with the blended gaseous mixture whereby a desired molar ratio of the first and second fluids is maintained so as to maintain the desired physical and chemical properties of the blended gaseous mixture and whereby condensation of the blended gaseous mixture is avoided in the distribution header. In one variation of this embodiment, the third fluid is an inert gas.

A fourth embodiment has one step in addition to the steps in the third embodiment. The additional step is to automatically maintain a desired flow ratio between the first and second fluids so as to maintain the desired physical and chemical properties of the blended gaseous mixture.

A fifth embodiment has two steps in addition to the steps in the first embodiment. The first additional step is to provide a storage buffer upstream of the distribution header. The second additional step is to deliver the blended gaseous mixture to the storage buffer prior to delivering the blended gaseous mixture to the distribution header.

A sixth embodiment is a dynamic blending gas delivery system for supplying a blended gaseous mixture to a distribution header from which the blended gaseous mixture is delivered to at least one chemical vapor deposition tool or similar process tool. The system includes: (1) means for supplying a first fluid; (2) means for heating the first fluid to a temperature where at least some portion of the first fluid is a vapor; (3) means for superheating the vapor portion of the first fluid to a temperature sufficient to avoid condensation of the blended gaseous mixture delivered to the at least one chemical vapor deposition tool or similar process tool; (4) means for supplying a second fluid; (5) means for heating the second fluid to a temperature sufficient to avoid condensation of the superheated vapor portion of the first fluid when the superheated vapor portion comes in contact with the second fluid; (6) means for combining the heated second fluid and the superheated vapor portion of the first fluid to form a blended gaseous mixture having desired physical and chemical properties for chemical vapor deposition, epitaxial film growth, or a similar process; and (7) means for delivering the blended gaseous mixture to the distribution header from which the blended gaseous mixture is delivered to the at least one chemical vapor deposition tool or similar process tool.

In the preferred embodiment, the first fluid is trichlorosilane (TCS) and the second fluid is hydrogen ($H_2$). However, fluids other than TCS may be used as the first fluid, including but not limited to silicon tetrachloride ($SiCl_4$), dichlorosilane ($SiH_2Cl_2$), tetraethylorthosilicate (TEOS), phosphorus oxychloride ($POCl_3$), trimethylsilane ($SiH(CH_3)_3$), boron trichloride ($BCl_3$), and tungsten hexafluoride ($WF_6$). Other possible second fluids include, but are not limited to, helium, nitrogen, argon and oxygen.

A seventh embodiment is a dynamic blending gas delivery system which is like the sixth embodiment but includes means for automatically maintaining a desired flow ratio between the first and second fluids so as to maintain the desired physical and chemical properties of the blended gaseous mixture. In the preferred embodiment, the means for automatically maintaining a desired flow ratio between the first and second fluids is a flow ratio controller.

In another variation of the seventh embodiment, the means for automatically maintaining a desired flow ratio between the first and second fluids includes: (1) means for measuring a flow rate of the first fluid; (2) means for measuring a flow rate of the second fluid; (3) means for measuring a change in pressure inside the distribution header; and (4) means for adjusting the flow rates of the first and second fluids at the desired flow ratio proportionally in an inverse relation to the measured change in pressure inside the distribution header.

A variation of this embodiment is an eighth embodiment, which includes the following additional elements: (1) a first sensor for sensing the flow rate of the first fluid and for providing a signal indicative thereof; (2) a second sensor for sensing the flow rate of the second fluid and for providing a signal indicative thereof; (3) a third sensor for sensing the change in pressure inside the distribution header and for providing a signal indicative thereof; and (4) a computer for receiving signals from the first, second, and third sensors, determining the flow rates of the first and second fluids, determining the change in pressure inside the distribution header, determining any adjustments required in the flow rates of the first and second fluids in order to maintain the desired flow ratio, and sending at least one signal indicative of the required adjustments in the flow rates to a flow ratio controller. In the preferred embodiment, the computer is a programmed logic controller.

A ninth embodiment includes three elements in addition to those in the sixth embodiment discussed above. The three additional elements are: (1) means for supplying a third fluid which does not react with the first or second fluids or with the blended gaseous mixture; (2) means for heating the third fluid to a temperature sufficient to avoid condensation of the blended gaseous mixture delivered to the at least one chemical vapor deposition tool or similar process tool; and (3) means for combining an amount of the heated third fluid in a gaseous phase with the blended gaseous mixture whereby a desired molar ratio of the first and second fluids is maintained and whereby condensation of the blended gaseous mixture is avoided in the distribution header. In a preferred embodiment, the third fluid is an inert gas, such as argon or helium.

A tenth embodiment has one step in addition to the steps in the ninth embodiment. The additional step is to automatically maintain a desired flow ratio between the first and second fluids so as to maintain the desired physical and chemical properties of the blended gaseous mixture.

An eleventh embodiment of the invention includes two elements in addition to those in the sixth embodiment discussed above. The two additional elements are: (1) a storage buffer upstream of the distribution header; and (2) means for delivering the blended gaseous mixture to the storage buffer prior to delivering the blended gaseous mixture to the distribution header.

In a twelfth embodiment, the dynamic blending gas delivery system includes means for purging the system.

A thirteenth embodiment is a system for blending and delivering a deposition process gas to at least one chemical vapor deposition tool or similar process tool. The system includes the following: (1) a distribution header for accumulating a deposition process gas and for distributing the deposition process gas to each tool in response to a demand from the tool; (2) a sensor in communication with the distribution header for determining a pressure drop in the distribution header caused by a change in flow of deposition process gas from the distribution header; (3) a supply of liquid deposition material; (4) a heater for vaporizing the liquid deposition mate rial and superheating the resulting vapor; (5) a first flow controller for controlling a rate of flow of the superheated vapor from the heater to the distribution header; and (6) means for regulating the first flow controller to allow a flow of the superheated vapor proportional in an inverse relation to a change in pressure inside the distribution header.

A fourteenth embodiment includes the following elements in addition to those in the thirteenth embodiment: (1) at least one supply of at least one carrier gas; (2) an additional flow controller in communication with each supply of carrier gas for controlling a rate of flow of each carrier gas; (3) means for regulating the additional flow controller to allow a flow rate in a pre-selected ratio to the mass flow rate of the superheated vapor through the first flow controller; (4) dynamic blending means for blending each flow-controlled carrier gas with the flow-controlled superheated vapor; and (5) means for delivering the resulting blended gaseous mixture to the distribution header. In one variation of this embodiment, there are at least two carrier gases at least one carrier gas being a reactive material and at least one carrier gas being an inert material.

A fifteenth embodiment is similar to the fourteenth embodiment but includes the additional element of heating means for raising the temperature of each carrier gas above the dewpoint of the superheated vapor prior to blending.

Another aspect of the invention is the blended gaseous mixture produced in accordance with the methods discussed above, including but not limited to the methods in the first and third embodiments.

DETAILED DESCRIPTION OF THE INVENTION

The present invention teaches a dynamic blending gas delivery system for delivering a blended gaseous mixture to one or more chemical vapor deposition tools or similar process tools. The invention also teaches a method for processing a plurality of fluids to form a blended gaseous mixture and delivering the blended gaseous mixture to a distribution header from which the blended gaseous mixture is delivered to one or more chemical vapor deposition tools or similar process tools.

Figure 1:
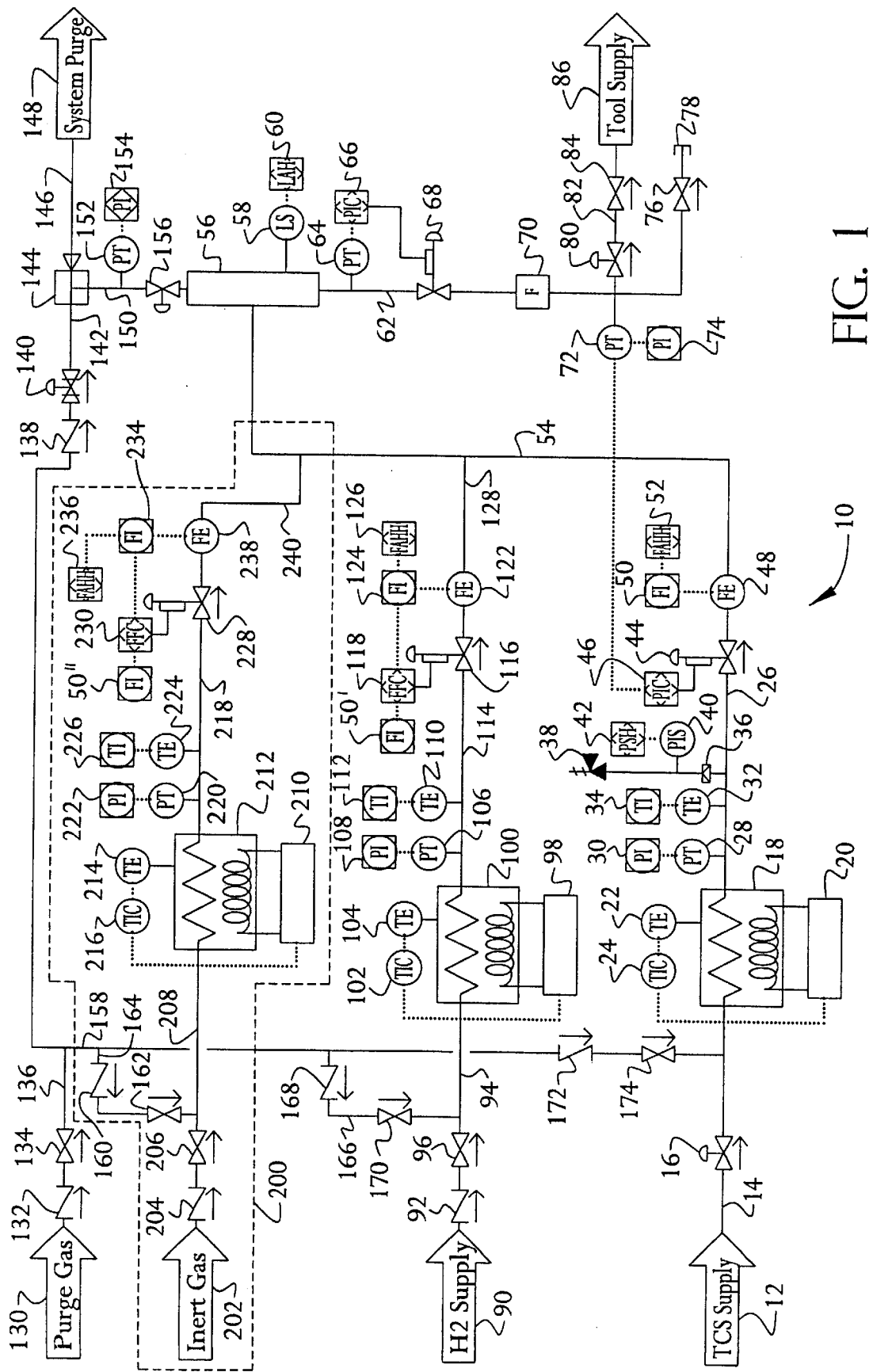
FIG. 1 is a process flow diagram illustrating the present invention.

A preferred embodiment of the invention is illustrated in FIG. 1. The specific case shown in FIG. 1 and discussed below is for blending TCS with $H_2$ gas to provide either a saturated or slightly de-saturated mixture. However, the invention may be used to dynamically blend fluids other than TCS and $H_2$ gas. Other fluids which may be used include, but are not limited to, silicon tetrachloride ($SiCl_4$), dichlorosilane ($SiH_2Cl_2$), tetraethylorthosilicate (TEOS), phosphorus oxychloride ($POCl_3$), trimethylsilane ($SiH(CH_3)_3$), boron trichloride ($BCl_3$), and tungsten hexafluoride ($WF_6$). Other gases which may be used include, but are not limited to, helium, nitrogen, argon, and oxygen.

The portion 200 of the system enclosed in doffed lines in FIG. 1 is optional. This optional feature provides the ability to de-saturate the gaseous mixture with an inert gas (such as argon or helium) to maintain a favorable TCS/$H_2$ ratio. (Other inert gases may be used. In fact, any gas which does not react with the gases being blended (e.g., TCS and $H_2$) could be used.)

Referring to FIG. 1, the TCS supply 12, which is in liquid form, flows through line 14 to heater 18. The flow in line 14 is regulated by pneumatic isolation valve 16. Heater 18 is an electric heater block which functions as a multiple pass heat exchanger. The heater vaporizes the liquid TCS and superheats the vapor to an operating temperature that avoids condensation in the downstream equipment, and in particular avoids condensation of the blended gaseous mixture at tool supply 86. (Tool supply 86 may be one or more chemical vapor deposition tools or similar process tools.) The heater is equipped with temperature element 22, which provides a signal indicative of the temperature of the TCS to temperature indicator controller 24, which signals control 20 to control the heater (i.e., to increase or decrease the energy input as required). The temperature indicator controller may include alarms for high and low temperatures.

The superheated TCS vapor flows from heater 18 via line 26. The pressure in line 26 is measured by pressure transducer 28, which provides a signal indicative of the pressure to pressure indicator 30. The pressure indicator may include alarms for high and low pressures. Similarly, the temperature in this line is measured by temperature element 32, which provides a signal indicative of the temperature to temperature indicator 34. The temperature indicator may include alarms for high and low temperatures.

Line 26 also is equipped with a rupture disk 36 and a safety valve 38, which includes pressure indicator switch 40 and high pressure switch 42.

The flow of superheated TCS vapor is controlled by pneumatically activated control valve 44, which operates proportionally to the pressure in distribution header 82, which feeds one or more process tools, generally identified as "Tool Supply" 86. The pressure in distribution header 82 is measured by pressure transducer 72, which signals pressure indicator controller 46 to control pneumatically activated control valve 44. Pressure indicator 74 may be equipped with an alarm for high and low pressures. A decrease in the pressure at distribution header 82 results in an increase in demand for TCS flow; conversely, an increase in the header pressure results in a decrease in demand for TCS flow. (In other words, the flow of TCS is adjusted proportionally in an inverse relation to the measured change in the pressure inside the distribution header.)

The flow of superheated TCS vapor is measured by mass flow element 48, which sends a signal to flow signal indicator 50, which signal is received by a Programmed Logic Controller (PLC) or other type of computer (not shown). That signal, indicative of the flow through the mass flow element 48, also is provided to high-high flow alarm 52. The PLC is adapted to receive input signals from, inter alia, sensing means for various parameters (e.g., temperatures, pressures, flows, etc.) and to send output signals to, inter alia, controllers which regulate control valves which control fluid flows to maintain a desired blend of gases.

The PLC (not shown) also provides a signal indicative of the flow of superheated TCS vapor to flow indicator 50', which signals flow ratio controller 118, which controls pneumatically activated valve 116 on the $H_2$ gas supply line 114 to maintain a desired flow ratio between the superheated TCS vapor and $H_2$ gas (the carrier gas). The $H_2$ supply 90 flows through line 94 to heater 100. Flow through line 94 can be restricted by check valve 92 and may be regulated by manual isolation valve 96. The $H_2$ gas stream is heated in heater 100 to minimize the potential that cold $H_2$ gas would cause condensation when the superheated TCS vapor comes in contact with the $H_2$ gas.

Temperature element 104 provides a signal to temperature indicator controller 102 which in turn signals control 98 to maintain the temperature of the $H_2$ supply at a desired temperature. The heated $H_2$ gas flows from heat exchanger 100 through line 114 to pneumatically actuated control valve 116. The temperature in line 114 is measured by temperature element 110, which provides a signal indicative of the temperature to temperature indicator 112, which may have alarms for high and low temperatures. The pressure in line 114 is measured by pressure transducer 106 which provides a signal indicative of the pressure to pressure indicator 108, which may have alarms for high and low pressure.

In addition to receiving the signal from flow indicator 50' (which indicates the flow of superheated TCS vapor through flow element 48), flow ratio controller 118 also receives a signal from flow indicator 124 (representing the flow of the gas through flow element 122, which provides an indicative signal to flow indicator 124). Flow indicator 124 also provides a signal to high-high flow alarm 126.

The heated $H_2$ gas (carrier gas) flows from flow element 122 through line 128, which connects to line 54 where the superheated TCS vapor blends with the heated $H_2$ gas. This blended gaseous mixture continues through line 54 to storage buffer 56, which mitigates flow disturbances due to batch processing downstream and minor composition variations caused when the system ramps up or down in total flow rate. The storage buffer is equipped with level switch 58, which detects any liquid and sends a signal to high liquid alarm 60. Should liquid rise to the alarm level, which might indicate a loss of heat at heater 18 and/or heater 100, the system is automatically shut down for protection.

The blended gas mixture flows from storage buffer 56 to line 62. The pressure in line 62 is measured by pressure transducer 64, which provides a signal indicative of the pressure to pressure indicator controller 66, which controls pneumatically actuated control valve 68. This valve maintains pressure in the storage buffer based on the set point of pressure transducer 64, which is set in accordance with the system operating conditions required by the end user (e.g., the process tools of a semiconductor fabricator).

From valve 68 the blended gaseous mixture continues to flow through line 62 and filter 70, which filters the blended gaseous mixture prior to entering the distribution header 82. Flow through the distribution header to the tool supply 86 may be regulated by pneumatic isolation valve 80 or manual isolation valve 84.

Analyzer connection 78 allows for sampling of the flow going to distribution header 82 through line 62. By attaching an analyzer to the analyzer connection it is possible to confirm the composition of the blended gaseous mixture stream. Manual isolation valve 76 is used to regulate flow to the analyzer connection.

The optional portion 200 of the system provides the ability to add helium, argon, or some other inert gas as a de-saturation gas. This allows the end user to maintain a specified molar ratio of TCS to $H_2$ gas while minimizing condensation in the gas distribution header 82.

The inert gas 202 flows through line 208 to heater 212. Check valve 204 and manual isolation valve 206 are available to regulate flow of the inert gas. Heater 212 is an electric heater block which functions as a multiple pass heat exchanger. The heat exchanger is equipped with temperature element 214 which provides a signal indicative of the temperature of the heated inert gas to temperature indicator controller 216 to control 210, which controls the heater 212.

The heated inert gas flows from heat exchanger 212 via line 218. The pressure in this line is measured by pressure transducer 220, which provides a signal indicative of the pressure to pressure indicator 222. The pressure indicator may include alarms for high and low pressures. Similarly, the temperature in this line is measured by temperature element 224, which provides a signal to temperature indicator 226. The temperature indicator may include alarms for high and low temperatures.

The flow of the heated inert gas is controlled by pneumatically activated control valve 228. This valve is regulated by flow ratio controller 230, which receives from the PLC a signal indicative of the flow of the superheated TCS vapor from flow indicator 50". Flow ratio controller 230 also receives from flow indicator 234 a signal indicative of the flow of the inert gas through flow element 238. Flow indicator 234 also provides a signal to high-high flow alarm 236.

From flow element 238, the heated inert gas goes through line 240 to line 54 where the heated inert gas mixes with the blended TCS/$H_2$ gaseous mixture. Adding the inert gas as a third component in the blended gaseous mixture lowers the dewpoint of the blended stream without affecting the desired molar ratio between the TCS and $H_2$ gas.

The TCS/$H_2$ reaction in epitaxial tools is described by the following reaction:

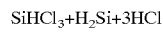

At stoichiometric conditions, one mole of $H_2$ is required to react with one mole of TCS. Under ideal conditions, the TCS/$H_2$ mixture would be fed to epitaxial tools or chemical vapor deposition tools with equimolar mixtures. However, the industry preference typically is to use excess $H_2$.

Figure 2:
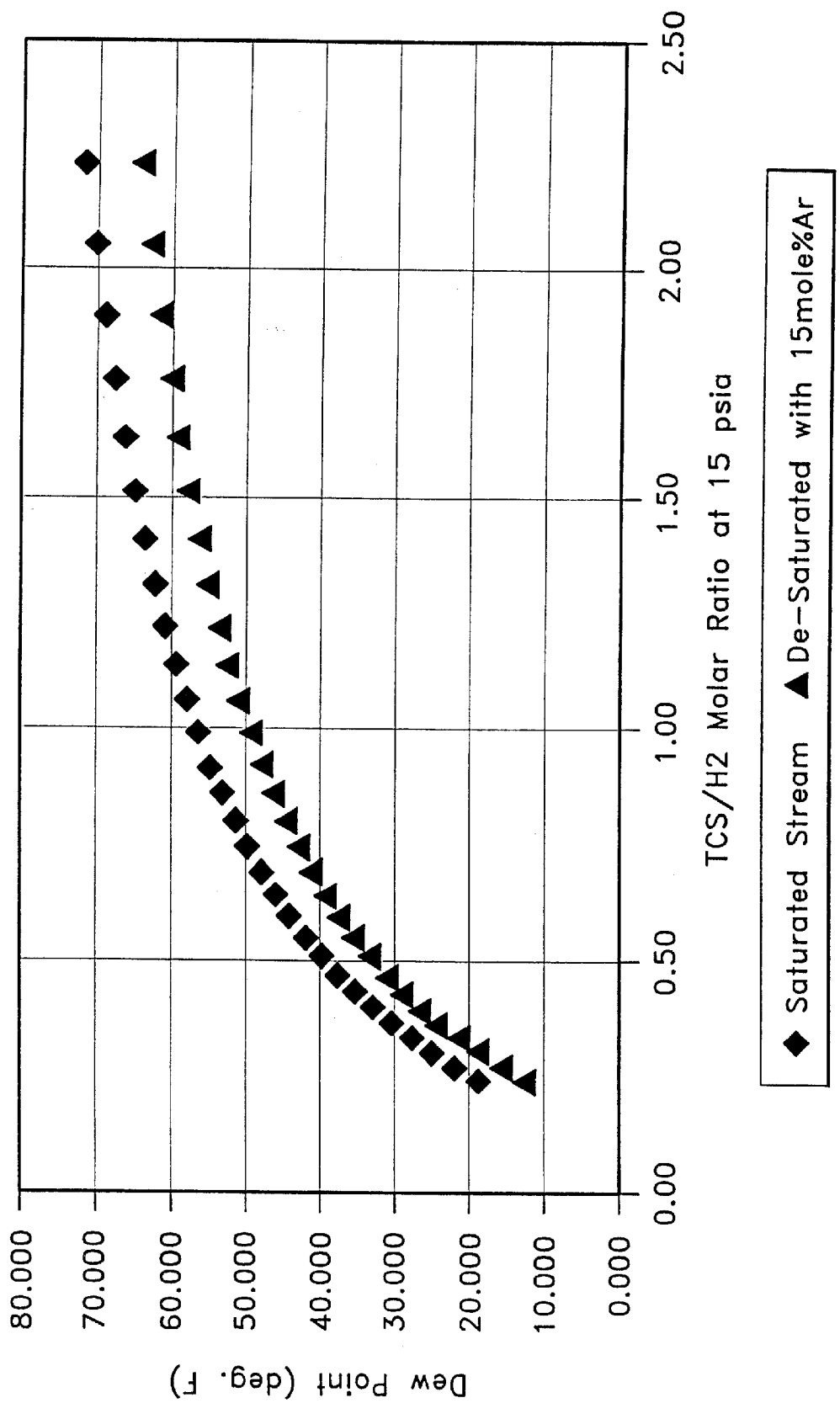
FIG. 2 is a graph showing saturation curves for a TCS/$H_2$ mixture at 15 psia for a saturated stream and for a stream de-saturated with 15 mole % Argon.

A saturation curve for the TCS/$H_2$ system is provided in FIG. 2. The upper line in the graph represents a saturated stream, and the lower line represents a de-saturated stream with 15 mole % argon. At 15 psia, for a given ratio of TCS/$H_2$ in the total stream, temperatures below each line indicate the presence of a liquid phase. Stream conditions above and to the left indicate de-saturated conditions, such as adding $H_2$ (lowering the TCS/$H_2$ ratio) to a previously saturated stream. For comparison purposes, the effect of adding argon as a third component (lowering the dewpoint) also is shown on the graph. This may be advantageous to certain end users who may want to de-saturate the stream without affecting the TCS/$H_2$ molar ratio.

The system may be purged by sweeping purge gas through the lines of the system prior to initial startup, during maintenance, and during final decommissioning. The purge gas 130 is an inert gas, such as argon. After the gas passes through the system, the system purge 148 is sent to a scrubber, burner, or other handling system (not shown). The flow of the purge gas from the purge gas supply 130 is regulated by various check valves (132, 160, 168, 172, 138) and manual isolation valves (134, 162, 170, 174). The purge gas flows from the purge gas supply to the system via line 136. Manual isolation valve 140 regulates the flow of the purge gas to venturi 144 (or other vacuum generator). Pressure transducer 152 measures the pressure in line 150 and provides a signal to pressure indicator 154, which is an interlock to close pneumatic isolation valve 156 on high pressure. Pressure indicator 154 may include alarms for high and low pressure.

What is claimed is:

1. A method for processing a plurality of fluids to form a blended gaseous mixture and supplying the blended gaseous mixture to a distribution header from which the blended gaseous mixture is delivered to at least one process tool, comprising the steps of:

supplying a first fluid;

heating the first fluid to a temperature where at least some portion of the first fluid is a vapor;

superheating the vapor portion of the first fluid to a temperature sufficient to avoid condensation of the blended gaseous mixture delivered to the at least one tool;

supplying a second fluid;

heating the second fluid to a temperature sufficient to avoid condensation of the superheated vapor portion of the first fluid when the superheated vapor portion comes in contact with the second fluid;

combining the heated second fluid and the superheated vapor portion of the first fluid to form a blended gaseous mixture having desired physical and chemical properties for the process tool; and delivering the blended gaseous mixture to the distribution header from which the blended gaseous mixture is delivered to the at least one tool.

2. A method as in claim 1, comprising the further step of automatically maintaining a desired flow ratio between the first and second fluids so as to maintain the desired physical and chemical properties of the blended gaseous mixture.

3. A method as in claim 2, wherein the step of automatically maintaining a desired flow ratio between the first and second fluids comprises the sub-steps of:

measuring a flow rate of the first fluid;

measuring a flow rate of the second fluid;

measuring a change in pressure inside the distribution header; and adjusting the flow rates of the first and second fluids at the desired flow ratio proportionally in an inverse relation to the measured change in pressure inside the distribution header.

4. A method as in claim 1, comprising the further steps of:

supplying a third fluid which does not react with the first or second fluids or with the blended gaseous mixture;

heating the third fluid to a temperature sufficient to avoid condensation of the blended gaseous mixture delivered to the at least one tool; and combining an amount of the heated third fluid in a gaseous phase with the blended gaseous mixture whereby a desired molar ratio of the first and second fluids is maintained so as to maintain the desired physical and chemical properties of the blended gaseous mixture and whereby condensation of the blended gaseous mixture is avoided in the distribution header.

5. A method as in claim 4, comprising the further step of automatically maintaining a desired flow ratio between the first and second fluids so as to maintain the desired physical and chemical properties of the blended gaseous mixture.

6. A method claim as in claim 4, wherein the third fluid is an inert gas.

7. A method as in claim 1, further comprising the steps of:

providing a storage buffer upstream of the distribution header;

delivering the blended gaseous mixture to the storage buffer prior to delivering the blended gaseous mixture to the distribution header.

8. A method as in claim 1, wherein the first fluid is trichlorosilane and the second fluid is hydrogen.

* * * * *